United States Patent [19]
Barnes

[11] 3,712,400
[45] Jan. 23, 1973

[54] THREE-WHEEL VEHICLE

[76] Inventor: Claude Earnest Barnes, 729 Inglewood Street, Salinas, Calif. 93901

[22] Filed: March 15, 1971

[21] Appl. No.: 124,385

[52] U.S. Cl. .................... 180/27, 180/27, 180/54 F, 280/274, 280/282
[51] Int. Cl. ............................................. B62d 61/08
[58] Field of Search ...... 180/25, 27, 54 F, 55, 56, 58, 180/59, 62

[56] References Cited

UNITED STATES PATENTS

| 1,991,619 | 2/1935 | Mackenzie | 180/54 F X |
| 2,554,261 | 5/1951 | Munger | 180/54 F |
| 3,004,619 | 10/1961 | Straussler | 180/27 |

FOREIGN PATENTS OR APPLICATIONS

| 380,866 | 9/1932 | Great Britain | 180/54 F |

OTHER PUBLICATIONS

Hot Rod Magazine, November 1970, pages 40–42.

*Primary Examiner*—Benjamin Hersh
*Assistant Examiner*—Leslie J. Paperner
*Attorney*—Towsend & Towsend

[57] ABSTRACT

A three-wheeled motor vehicle adapted for a wide range of competitive and recreational motor sports activities. A multi-cylinder internal combustion engine having a large displacement relative to conventional three-wheeled vehicle engines is mounted on the rear axle with its center of weight acting behind the center of rotation of the two rear driving wheels. A statically balanced weight distribution is achieved with respect to the driving wheels whereby the total effective vehicle weight is applied just ahead of the rear wheels to obtain maximum traction. A lightweight tubular frame supports the rider at an extended distance forward of the rear axle in order to utilize the weight of the rider to oppose the upward force on the single front steering wheel resulting from the dynamic torque of the engine. The dynamically balanced weight distribution keeps the vehicle front wheel on the ground at all times and provides stability and maneuverability even during periods of maximum torque and acceleration.

5 Claims, 4 Drawing Figures

PATENTED JAN 23 1973 3,712,400
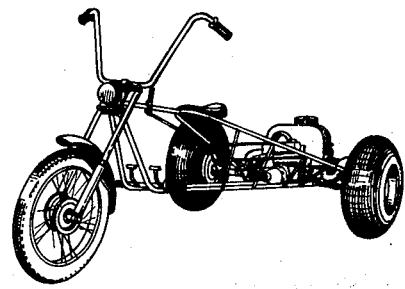
FIG_1
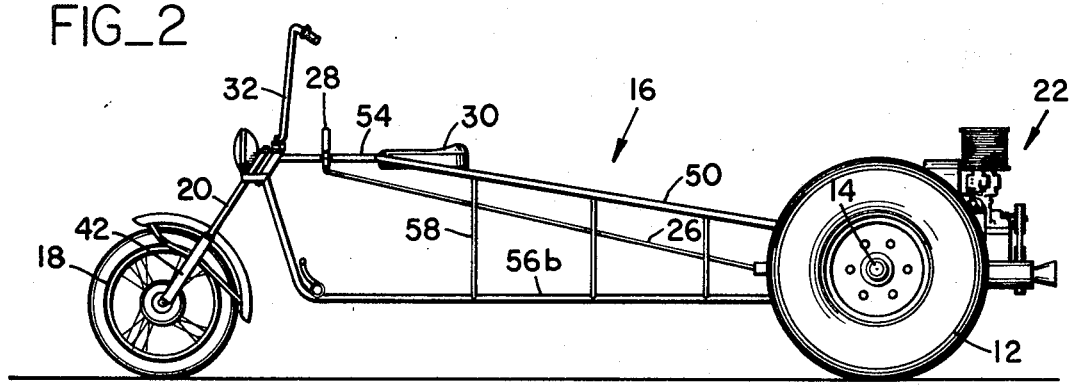
FIG_2
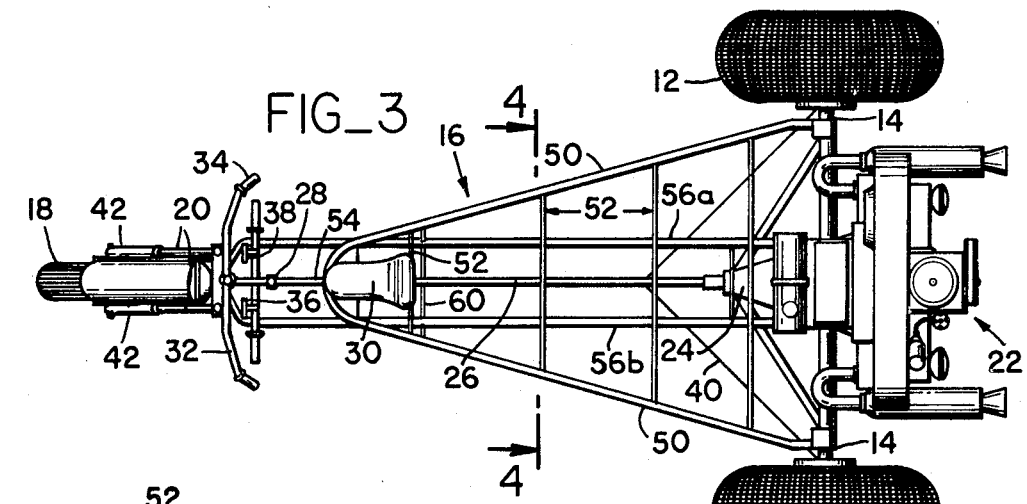
FIG_3
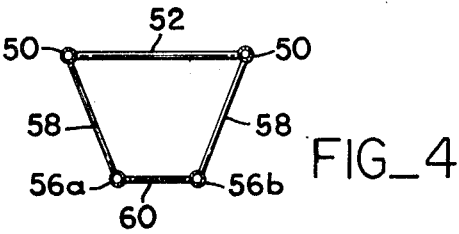
FIG_4
INVENTOR.
CLAUDE EARNEST BARNES
BY
*Townsend and Townsend*
ATTORNEYS

THREE-WHEEL VEHICLE

The present invention relates to motor vehicles and is more particularly directed to a three-wheeled motor vehicle which is suitable for a wide range of competitive and recreational motor sport activities and may be easily converted to licensed street use.

Conventional vehicles employed in various motor sports such as drag racing, cross-country racing and hill climbing are each designed to emphasize those characteristics which are most important in the particular activity for which the vehicle is used.

Thus, the primary design consideration in the case of drag racing is the extremely fast acceleration capability which characterizes the dragster. Dragsters commonly employ a large high performance engine mounted on a lightweight tubular frame resulting in a high horsepower to weight ratio which provides the necessary power. This power is translated into high acceleration rates by achieving the maximum possible traction. Since maximum traction is obtained when the center of weight of the vehicle is as close as possible to the point of contact between the driving wheels and the road surface, the engine and driver are both positioned just ahead of the dragster's rear wheels. However, the combination of this unbalanced weight distribution vis-a-vis front and rear wheels and the high torque of the engine tends to lift the front wheels of the vehicle off the ground during periods of maximum acceleration. This effect makes the vehicle unusable in situations where the front wheels are used for steering and restricts its use to movement in a straight line. In addition, since maximum traction is essential a paved surface is necessary for optimum vehicle performance.

The most desirable characteristic of conventional vehicles used in cross-country racing over rough terrain and soft surfaces such as dirt, sand or mud is a combination of traction and maneuverability and so-called "off the road" vehicles have been developed to maximize these features. The dune buggy, for example, is provided with a relatively smaller engine and heavier frame than the dragster and has a correspondingly lower acceleration capability due to the reduced horsepower to weight ratio. However, by positioning the engine over or behind the rear axle and providing the vehicle with wide deep-treaded tires having a large road gripping surface good traction is obtained despite an overall weight distribution which is relatively evenly balanced between the front and rear wheels. This balanced weight distribution maintains all four wheels of the vehicle in contact with the ground and gives the dune buggy the maneuverability required for cross-country racing.

In the case of hill climbing, the vehicle most often used is the motorcycle. Motorcycles commonly employ a comparatively small engine in relation to the two previously mentioned types of vehicles but the frame is also proportionately lighter. Thus, the motorcycle has a horsepower to weight ratio and resulting acceleration which may approach that of the dragster. Also, since the engine is conventionally centrally mounted, the weight is evenly distributed between the front and rear wheels with resulting stability. This combination of power and stability makes the motorcycle the most adapted vehicle for hill climbing sports.

In contrast to the above vehicles, the present invention combines those characteristics which are most desirable for a wide range of motor sports activities.

Accordingly, it is a primary object of the present invention to provide a three-wheeled vehicle having a design which combines a high horsepower to weight ratio and torque with good traction without sacrificing handling characteristics such as maneuverability and stability.

This object is accomplished by use of a relatively large internal combustion engine having its center of weight behind the center of rotation of the two driving wheels in combination with an elongated lightweight tubular frame which supports the vehicle rider at an extended distance forward of the driving wheels.

The powerful engine and lightweight frame provide the advantage of a high horsepower to weight ratio and high torque resulting in good overall power. The placement of the engine behind the rear axle translates this power into a fast acceleration capability by positioning the effective center of weight of the entire vehicle just ahead of the rear driving wheels to insure maximum traction. A static weight distribution is obtained wherein the weight of the engine assembly acting behind the rear axle is counterbalanced by the weight of the frame and front wheel assembly acting ahead of the rear axle. The vehicle weight is thus statically balanced with respect to the driving wheels by applying the total effective weight of the vehicle just ahead of the point of contact between the driving tires and the road surface. This weight distribution is combined with use of wide high-traction tires on the driving wheels to achieve a significant increase in traction over conventional vehicles. Placement of the driver position just behind the front wheel and at an extended distance forward at the rear axle counterbalances the upward force on the front wheel due to the dynamic engine torque and holds the front wheel in contact with the road surface resulting in increased maneuverability and stability.

In addition to use in competitive motor sports events the vehicle of the present invention finds usefulness in recreational activities such as hunting and fishing where supplies may be transported to camp sites which are inaccessible with more conventional vehicles. Also the vehicle of the present invention may be converted to a street legal condition for touring, delivery, etc.

These and other objects features and advantages of the present invention will be more readily apparent after referring to the following detailed description and accompanying drawings wherein:

FIG. 1 is a perspective view of the vehicle of the present invention according to a preferred embodiment;

FIG. 2 is a side elevation view of the vehicle of FIG. 1;

FIG. 3 is a plan view of the vehicle of FIG. 1; and

FIG. 4 is a simplified section view of the vehicle frame taken along lines 4—4 of FIG. 3.

Referring now to the drawings wherein like numerals in the different views refer to the same element, a three-wheeled vehicle shown generally in FIG. 1 is provided having two driving wheels 12 mounted at the rear of the vehicle at opposite ends of rear axle 14. A tubular frame 16 is mounted on rear axle 14 and projects forwardly therefrom. Frame 16 is supported at the front of the vehicle by a front wheel assembly including steering wheel 18 and fork unit 20.

An internal combustion engine 22 is mounted on rear axle 14 and extends rearwardly therefrom so that its effective center of gravity is behind rear axle 14. The engine can be of any conventional internal combustion type and most preferably is a lightweight, multicylinder automobile engine such as that found in a Volkswagen. Alternatively, a more powerful V-8 engine may be employed for increased power and acceleration capability. In either case the engine has a large displacement relative to conventional three-wheeled vehicle engines.

Transmission 24 is mounted to engine 22 and extends forwardly therefrom over rear axle 14. Shifting linkage 26 connects shift lever 28 to transmission 24. Shift lever 28 is mounted on frame 16 at a position conveniently accessible to the vehicle rider seated on seat 30. Handlebars 32 are attached to frame 16 and fork unit 20 and allow the rider to change the direction of front wheel 18 and thereby steer the vehicle.

Throttle control 34 is attached to an exterior end of handlebars 32 and foot-operated clutch pedal 36 and foot-operated brake pedal 38 are mounted on the lower front portion of frame 16 near the riders feet. Brake cables 40 connect brake pedal 38 to brakes mounted on each of rear wheels 12. Throttle control 34 and clutch pedal 36 are each connected to the engine-transmission assembly by appropriate linkage not shown. Various conventional mechanical systems such as front wheel shock absorbers 42 and an independent torsion bar rear suspension system (not shown) are preferably added to improve vehicle handling.

It can be seen from FIGS. 1 and 2 that frame 16 is of an elongated design which positions the front wheel assembly at an extended distance forward of rear axle 14 relative to conventional three-wheeled vehicles such as motorcycles. Recalling that engine 22 is mounted with its center of weight behind rear axle 14, the object of this elongated chassis configuration will be appreciated.

The vehicle weight distribution is statically balanced about rear axle 14 so that while the vehicle is stationery with the rider dismounted the moment or static torque of the weight of engine 22 about axle 14 acting through its effective center of weight behind rear axle 14 is counterbalanced by an opposing moment due to the effective center of weight of the frame and front wheel assembly acting forwardly of rear axle 14. The center of weight of the entire vehicle is thereby located immediately ahead of rear axle 14. This results in maximum traction since the effective weight of the vehicle is applied very near the point of contact between the tires and the road surface.

Seat 30 is placed at an extended distance forward of rear axle 14 in order to stabilize the vehicle in the dynamic mode with the rider seated and the vehicle in motion under power of engine 22. In this situation, the weight of the rider is utilized to oppose the upward force on front wheel 18 resulting from the maximum dynamic torque which is anticipated from engine 22. This dynamic balancing maintains front wheel 18 in contact with the ground at all times and insures sufficient control of the vehicle even during periods of maximum torque and acceleration.

Frame 16 includes a V-shaped upper member 50 having two divergent arms, the exterior ends of which are mounted on rear axle 14. V-shaped member 50 projects forwardly and upwardly from rear axle 14 and terminates in an apex just ahead of seat 30. Upper cross members 52 connect opposing portions of each of the divergent arms of V-shaped upper member 50 for structural rigidity. Seat 30 is mounted at its front end to the apex of V-shaped member 50 and at its rear end to one of cross members 52. Frame member 54 connects V-shaped member 50 at its apex to front wheel fork assembly 20. Shift lever 28 is attached to frame member 54 at a point midway between its ends.

Two parallel lower members 56 are attached at one end to rear axle 14 and project forwardly therefrom. At their forward ends, lower members 56 curve vertically upwards and are attached to fork assembly 20 just below the point of attachment of frame member 54. Vertical side members 58 connect each of lower members 56 with vertically aligned portions of overlying V-shaped member 50. Lower cross members 60 connect opposite portions of lower members 56.

The combination of the two divergent arms of V-shaped member 50 at the top of the frame, the two lower members 56 at the bottom of the frame cross members 52 and 60, and side members 58 together give the frame a trapezoidal cross-section most clearly shown in the simplified section view of FIG. 4. This particular chassis shape provides maximum stability against vehicle roll.

In addition to competitive motor sports events, it is contemplated that the vehicle of the present invention will find usefulness for other recreational activities such as hunting and fishing. In such situations, the vehicle provides an excellent means of transporting supplies to a campsite which is inaccessible to most conventional vehicles. In addition, the vehicle of the present invention can be readily converted to "street legal" condition by the addition of running lights, etc. In this context two bucket seats can easily be bolted onto the frame ahead of the rear axle to accommodate two passengers for touring, or alternatively a small pickup box can be bolted to the frame for delivery or other commercial uses.

These and other modifications may be made without departing from the spirit and scope of the invention and the form of the invention as described above is to be taken as a preferred embodiment for purposes of clarity and understanding and not by way of limitation.

What is claimed:

1. In a three-wheeled motor vehicle having engine means, a rear axle operably connecting a spaced pair of driving wheels to said engine means, a seat adapted to support a rider, and a single steering wheel assembly supporting the front of said vehicle, the improvement comprising: means mounting said engine on said vehicle for projection rearwardly of said axle to position the center of weight of said engine behind said axle; an open tubular frame mounted on said axle and projecting forwardly therefrom to position said steering wheel assembly at a sufficiently extended distance forward of said axle to permit the weight of said frame and steering wheel assembly extending forwardly of said axle to statically counterbalance the weight of said engine means extending rearwardly of said axle and to locate the effective center of weight of said vehicle immediately forward of said axle, said seat being mounted on said frame at an extended distance forward of said axle and toward said steering wheel assembly to permit the effective weight of said rider to be applied near the front wheel so as to oppose the upward force on said front wheel resulting from the dynamic torque of said engine and to thereby maintain said steering wheel in contact with the vehicle supporting surface.

2. A chassis for a three-wheeled motor vehicle having an internal combustion engine, two spaced driving wheels at the rear of said vehicle operably connected to said engine by an axle and a single steering wheel assembly supporting the front end of said vehicle, comprising: means mounting said engine on said vehicle for projection rearwardly of said axle to position the center of weight of said engine behind the center of rotation of said driving wheels; an open tubular frame mounted on said axle and projecting forwardly therefrom to position said steering wheel assembly at a sufficiently extended distance forward of said axle to permit the weight of said frame and front wheel assembly extending forwardly of said axle to counterbalance the weight of said engine extending rearwardly of said axle and to locate the effective center of weight of said vehicle immediately forward of said axle; and a riders seat mounted on said frame at an extended distance forward of said axle to permit the weight of the rider to oppose the upward force on said steering assembly resulting from the dynamic torque of said engine.

3. A three-wheeled motor vehicle comprising: engine means; a spaced pair of driving wheels operably connected to said engine means; an axle connecting said driving wheels and said engine means; means mounting said engine on said vehicle for projection rearwardly of said axle to position the effective center of weight of said engine behind said axle; a steering wheel assembly supporting said vehicle at its forward end; an open tubular frame mounted on said axle and projecting forwardly therefrom to position said steering wheel assembly at a sufficiently extended distance forward of said axle to permit the weight of said frame and steering wheel assembly extending forwardly of said axle to counterbalance the weight of said engine means extending rearwardly of said axle and to locate the effective center of weight of said vehicle immediately forward of said axle; means for steering said steering wheel; and, a seat adapted to support a rider and being mounted on said frame at an extended distance forward of said axle to permit the weight of said rider to oppose the upward force on said front wheel assembly produced by the dynamic torque of said engine whereby said steering wheel is maintained in contact with the supporting surface.

4. The vehicle of claim 3 and wherein said engine means comprises a multicylinder automobile type internal combustion engine.

5. The vehicle of claim 3 further comprising a pair of wide deep treaded automobile tires having a high traction surface mounted on each of said rear wheels.

* * * * *